United States Patent [19]

Matsuoka

[11] Patent Number: 4,831,836
[45] Date of Patent: May 23, 1989

[54] FREQUENCY CONTROL APPARATUS OF A MULTI-REFRIGERATION CYCLE SYSTEM

[75] Inventor: Fumio Matsuoka, Kamakura, Japan

[73] Assignee: Mitsubishi Denki Kabushiki Kaisha, Tokyo, Japan

[21] Appl. No.: 184,024

[22] Filed: Apr. 20, 1988

[30] Foreign Application Priority Data

Apr. 22, 1987 [JP] Japan .................................. 62-99166
Jul. 17, 1987 [JP] Japan .................................. 62-178309

[51] Int. Cl.$^4$ ............................................. F25B 41/00
[52] U.S. Cl. ......................................... 62/209; 62/215; 62/228.4
[58] Field of Search ..................... 62/228.3, 228.4, 215, 62/175, 209; 165/22; 417/45; 318/807, 334

[56] References Cited

U.S. PATENT DOCUMENTS

| | | | |
|---|---|---|---|
| 1,068,623 | 7/1913 | Bodine . | |
| 2,295,992 | 9/1942 | Gonzalez et al. . | |
| 2,444,593 | 7/1948 | Davis . | |
| 2,964,923 | 12/1960 | Cone | 62/196 |
| 3,264,837 | 8/1966 | Harnish | 62/117 |
| 3,367,130 | 2/1968 | Owens | 62/222 |
| 4,055,963 | 11/1977 | Shoji et al. | 62/197 X |
| 4,122,688 | 10/1978 | Mochizuki et al. | 62/178 |
| 4,227,380 | 10/1980 | Lauks et al. | 62/117 |
| 4,480,442 | 11/1984 | Ide et al. | 62/228.4 X |
| 4,724,680 | 2/1988 | Kawai | 318/807 X |
| 4,738,118 | 4/1988 | Kanazawa | 417/45 X |

*Primary Examiner*—William E. Wayner
*Attorney, Agent, or Firm*—Oblon, Fisher, Spivak, McClelland & Maier

[57] ABSTRACT

A frequency control apparatus of a multi-refrigeration cycle is provided with a current sensor to detect a primary current for a motor or a pressure sensor to detect a pressure at the discharge side of a compressor to detect a load in the refrigeration cycle. When a value detected by the sensor is estimated as being lower than a predetermined value range, the frequency of a current to be supplied to the motor is increased, and when the value detect by the sensor is estimated as being higher than the predetermined value range, the frequency is decreased, whereby the rising time of the refrigeration cycle can be shortened. Further, the frequency is determined by a weighted error average value of the difference between target room temperature in the rooms and detected temperature in the rooms to thereby control the multi-refrigeration cycle to provide an appropriate performance.

3 Claims, 3 Drawing Sheets

FREQUENCY CONTROL APPARATUS OF A MULTI-REFRIGERATION CYCLE SYSTEM

BACKGROUND OF THE INVENTION

1. FIELD OF THE INVENTION

The present invention relates to a frequency control apparatus of a multi-refrigeration cycle system. More particularly, it relates to such apparatus for controlling the frequency of an electric current to be supplied to a motor to control driving speed.

2. DISCUSSION OF THE BACKGROUND

FIG. 3 is a block diagram showing a conventional speed control apparatus for a motor used for an air conditioning apparatus which is disclosed, for instance, in Japanese Unexamined Patent Publication No. 28902/1986.

In FIG. 3, a reference numeral 1 designates an input control device which specifies an operating mode for an air conditioning apparatus, a numeral 2 designates a target temperature setting device for setting a temperature in a room, a numeral 3 designates a room temperature sensor, a numeral 4 designates a logical operation unit which comprises a temperature error detector 5, an initial speed generator 6, a drive/stop signal generator 7, a temperature-error-change detector 8, a temperature-error-upper-limit detector 9, a driving speed determining device 10 and a timer 11. A numeral 12 designates a motor driving controller, and a numeral 13 designates a motor.

The operation of the conventional speed control apparatus will be described. The logical operation unit 4 receives a signal of the operating mode such as cooling or warming operation and a drive/stop instruction signal to the air conditioning apparatus which are provided by the input control device 1, a signal on the information of target room temperature which is provided from the temperature setting device 2 and a digital signal converted from an analogue output signal from the room temperature sensor 3, and conducts logic operations on the basis of the input signals. As a result of the logic operations, the logical operation unit 4 outputs a drive/stop signal and a driving speed signal to the motor driving controller 12 so that the operation of the motor 13 is controlled.

In the conventional speed control apparatus, since the output signal of the target room temperature by the target temperature setting device 2 and the output signal by the room temperature sensor 3 were respectively inputted in the logical operation unit 4, there was provided no signal with respect to a primary current to be supplied to the motor 13. Accordingly, operations of the speed control apparatus were often stopped when an over current preventing means was actuated. For this purpose, it was necessary to determine an upper limit of frequency on the basis of a temperature level. Further, it was necessary to prevent an excessive primary current from flowing when an excessive load caused by, for instance, a liquid-back phenomenon was applied to the motor. Also, the conventional speed control apparatus has a disadvantage that a load was rapidly increased by reduction of the revolution speed of the fan in a room side heat exchanger so that the primary current exceeded its upper limit. Further, when a plurality of room side units were operated, it was impossible to treat the signals of the target room temperature setting devices and the room temperature sensors.

Further, in the conventional speed control apparatus, when the frequency of a current for driving the motor was increased in response to an error signal between a room temperature and a target temperature, a pressure produced in the multi-referigeration cycle system exceeded a predetermined upper limit pressure to thereby cause stop of the compressor by actuation of a device which prevents production of a high pressure. For this purpose, it was necessary to predetermine the upper limit of the maximum frequency depending on a temperature level. In addition, it was necessary to prevent a pressure from increasing when an excessive load caused by, for instance, the liquid-back phenomenon was applied to the compressor. Further, the conventional speed control apparatus had disadvantages that when revolution speed of the fan in the room side heat exchanger was decreased, a load was rapidly increased, so that a pressure produced exceeded a predetermined upper limit value, and when a plurality of room side heat exchangers were operated, it was impossible to treat the signals of the target temperature setting devices and the room temperature sensors.

SUMMARY OF THE INVENTION

It is an object of the present invention to provide a frequency control apparatus of multi-refrigeration cycle system which detects directly a value corresponding to a load in the refrigeration cycle such as a primary current to be supplied to the motor or a pressure at the discharge side of the compressor, and controls the frequency of a current supplied to the motor on the basis of the detected value to thereby increase the rising speed in the refrigeration cycle.

It is another object of the present invention to provide a frequency control apparatus of a multi-refrigeration cycle system which is capable of controlling the frequency of a current to be supplied to the motor when a plurality of room side units are operated.

The foregoing and the other objects of the present invention have been attained by providing a frequency control apparatus of a multi-refrigeration cycle system comprising a motor for a compressor, the motor being driven at a variable speed by controlling frequency and a temperature error detecting means to detect an error between a target temperature in rooms to be air-conditioned and an actual temperature in the rooms to thereby generate an instruction of speed depending on the temperature error so as to control driving speed for the motor, the frequency control apparatus being characterized by comprising a sensor for detecting a load in refrigeration cycle operations, an estimating and juding means for making judgement as to whether or not an output value from the sensor is in a predetermined range, and a controlling means which corrects to increase the frequency in response to the instruction of speed when an estimated value of the output is lower than the predetermined range, and corrects to decrease the frequency in response to the instruction of speed when the estimated value is higher than the predetermined range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
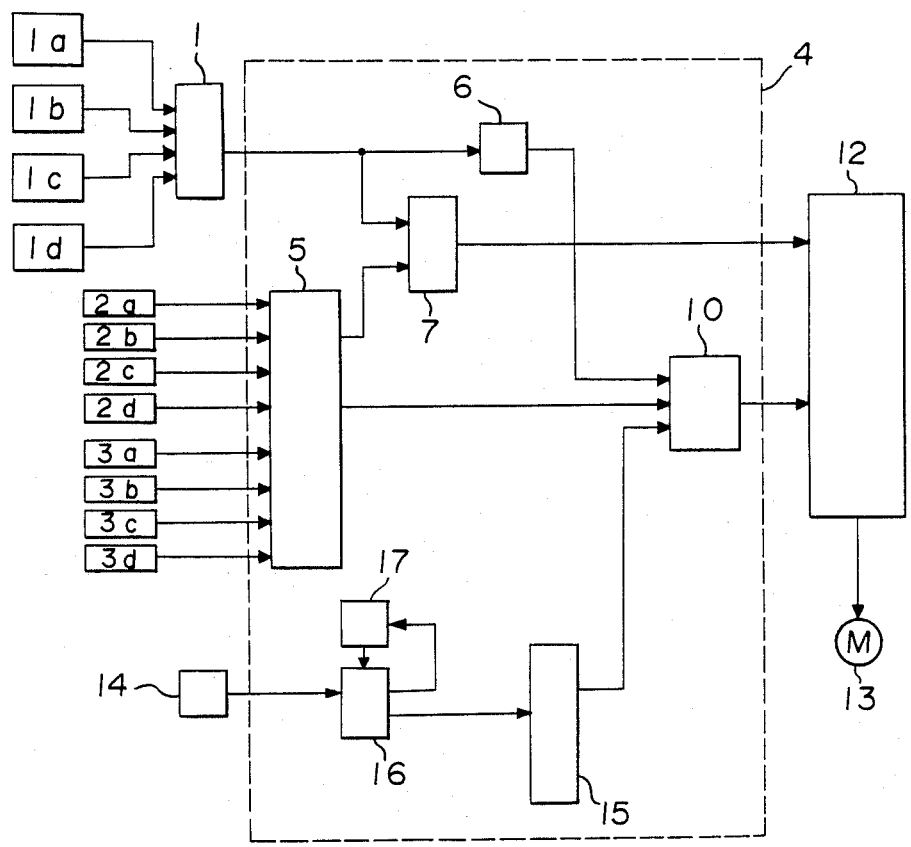
FIG. 1 is a block diagram of a first embodiment of the frequency control apparatus of a multi-referigeration cycle system according to the present invention.

Referring to the drawings, wherein the same reference numerals designate the same or corresponding parts in the several views, and more particularly to FIG. 1 thereof, there is shown a block diagram of an embodiment of the frequency control apparatus of a multi-referigeration cycle system according to the present invention. In FIG. 1, reference numerals 1a through 1d designate input control devices, numerals 2a through 2d designate target temperature setting devices, numerals 3a through 3d designate room temperature sensors, a numeral 4 designates a logical operation unit, a numeral 5 designates a weighted error detector, a numeral 6 designates an intial speed setting device, a numeral 7 designates a drive/stop signal generator, a numeral 10 designates a driving speed determining device, a numeral 12 designates motor driving controller, a numeral 13 designates a motor, a numeral 14 designates a primary current sensor to detect a primary current to be supplied to the motor, a numeral 16 designates a current-derivative device to obtain an amount of change in the value of the primary current, a numeral 17 designates a timer, and a numeral 15 designates a current value range judging device.

The operation of the embodiment having the above-mentioned construction will be described.

The logical operation unit 4 receives, from the input control devices 1a-1d provided in rooms, instruction signals concerning operating mode such as room-cooling, room-warming and so on and driving or stopping of air conditioning apparatus, signals concerning target room temperature produced by the target temperature setting devices 2a-2d, signals from the room temperature sensors 3a-3d, and a signal concerning the primary current for the motor from the primary current sensor 14. The logical operation unit 4 carries out logic operations on the basis of these input signals to output a drive/stop signal for the motor 13 and a driving speed signal to the motor driving controller 12 through the drive/stop signal generator 7 and the driving speed determining device 10 which are included in the logical operation unit 4. In accordance with the signals from the logical operation unit 4, the motor driving controller 12 controls operations of the motor 13.

The function of each of the devices constituting the logical operation unit 4 is described in more detail.

The weighted error detector 5 compares set values determined by the target temperature setting devices 2a-2d with room temperatures obtained by the room temperature sensors 3a-3d to produce each temperature error $\Delta Ta-\Delta Td$. Each of the temperature errors is multiplied by a performance ratio possessed by a room unit only in a case that the input control devices 1a-1d provided in the rooms are in ON state, whereby a weighted error is obtained. Then, a value obtained by multiplying a constant K with thus obtained value of weighted error is supplied as an output signal to the drive/stop signal generator 7 and the driving speed determining device 10.

The drive/stop signal generator 7 receives output signals from the input control devices 1a-1d and the weighted error detector 5, and generates a signal of drive or stop to the motor driving controller 12. At the initiation of the operations, the initial speed setting device 6 receives signals from the input control devices 1a-1d, and supplies a signal specifying an initial speed to the driving speed determining device 10.

A signal from the primary current sensor 14 is inputted in a current-delivative device 16 to obtain the reference value $\Delta I1$ between the primary current value a at present and a predetermined time $\Delta t$ before (which is determined by the timer 17). A signal of the sum of an estimated primary current I measured by the current-delivative device 16 and the difference value $\Delta I1$ are supplied to the current value range judging device 15. The current value range judging device 15 adds "+1" to a signal to be supplied to the driving speed determining device 10 when the value of the estimated current I $+\Delta I$ is smaller than the lowest value I1 of the current value range; it adds "$-1$" when the estimated primary current I$+\Delta I$ is greater than the highest value I2 of the current value range, and it adds a value of "0" when the value of the estimated primary current I$+\Delta I$ is within the current value range I1-I2.

The driving speed determining device 10 receives signals from the initial speed setting device 6, the weighted error detector 5 and the current value range judging device 15.

When there is a signal from the initial speed setting device 6, i.e. in the case of "+1", a signal of previously determined initial speed is given with priority to the motor driving controller 12.

When there is no signal from the initial speed setting device 6, i.e. in the case of "0" and a signal from the current value range judging device 15 is "0", a signal indicative of a quantity of speed change K$\Delta$THz which is obtained by multiplying a temperature error component $\Delta T$ outputted from the weighted error detector 5 by a set value K is supplied to the motor driving controller 12. When a signal from the current value range judging device 15 is "+1", a signal of K$\Delta$THz$+\Delta$Hz obtained by adding a correction item for enlargement $\Delta$Hz is supplied to the controller 12. On the contrary, when a signal from the current value range judging device 15 is "$-1$", a signal K THz$-$Hz obtained by adding a correction item for reduction $-$ Hz is supplied to the controller 12.

Thus, in accordance with the first embodiment of the present invention, the primary current sensor and the primary current estimating means are provided as a sensor to control the operation of the motor. When an estimated current value is lower than a predetermined current value range, the frequency of the current is modified to be increased. On the other hand, when an estimated current value is higher than the predetermined current value range, the frequency is modified to be reduced. Accordingly, continuous operation is possible without reaching the upper limit of current value and the rising speed in a refrigeration cycle can be quick so that reliability of the control apparatus can be increased as well as comfortableness. Further, since the frequency is determined by using a weighted average value of temperature error in rooms in a multi-refrigeration cycle, an appropriate performance is obtainable.

A second embodiment of the present invention will be described with reference to FIG. 2, in which a pressure sensor is used to detect a pressure in a compressor instead of a current sensor to detect a primary current for the motor as in the first embodiment.

Figure 2:
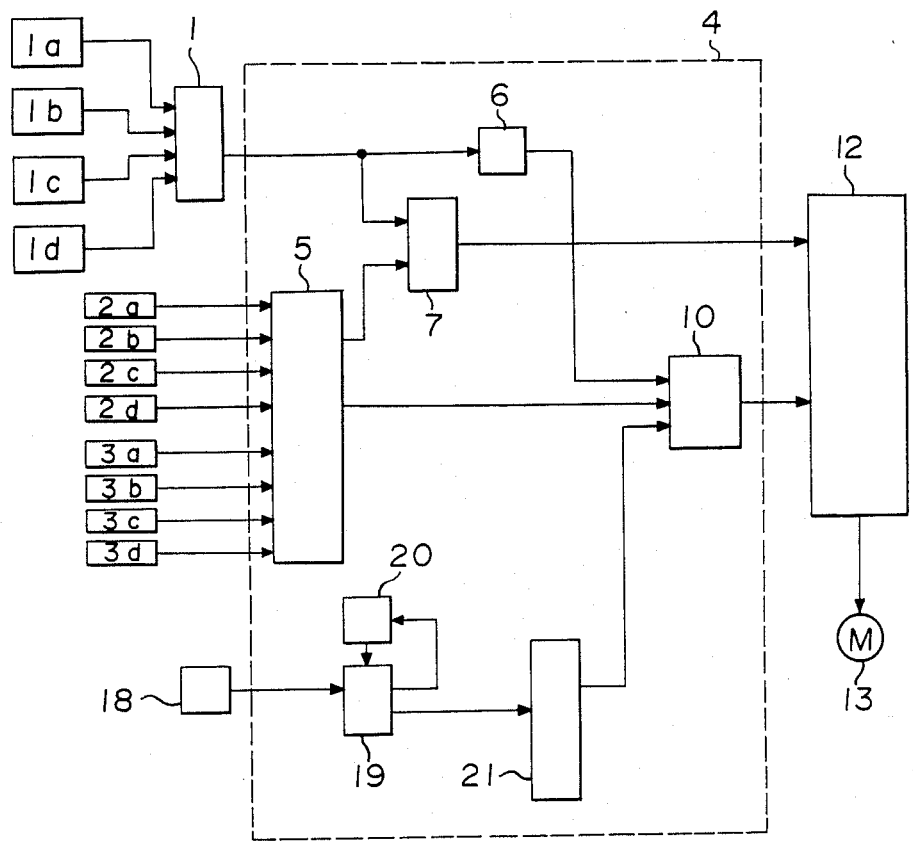
FIG. 2 is a block diagram of a second embodiment of the frequency control apparatus according to the present invetion.
Figure 3:
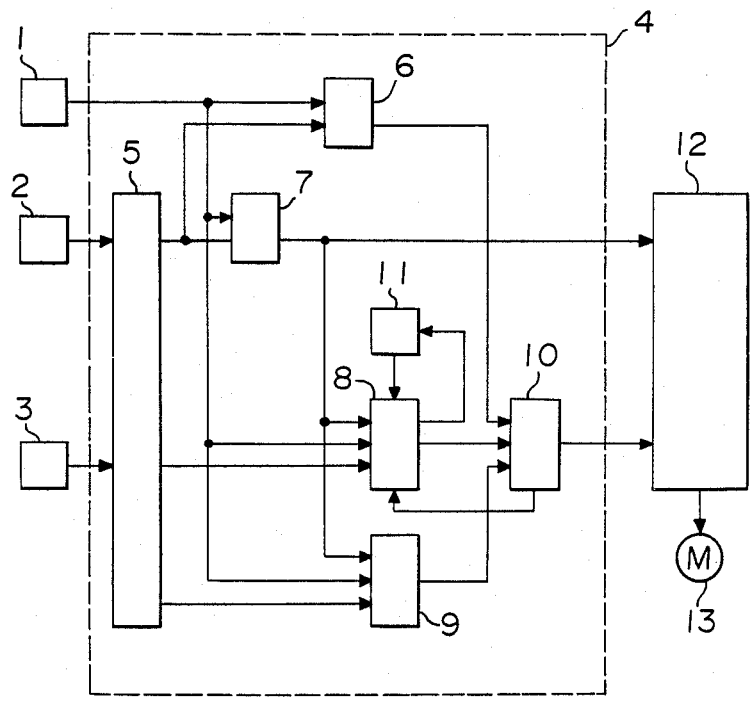
FIG. 3 is a block diagram showing a conventional frequency control apparatus.

In FIG. 2, reference numerals 1 through 13 designate the same parts as those of the first embodiment shown in FIG. 1. A reference numeral 18 designates a pressure sensor to detect a pressure at the discharge side of the compressor, a numeral 19 designates a pressure-derivative device to output an estimated pressure value which is obtained from a quantity of change in a pressure detected by the pressure sensor, a numeral 20 designates a timer for controlling operating time for the pressure-derivative device, and a numeral 21 designates a pressure value range judging device which makes judgement as to whether or not the estimated pressure signal of the pressure-derivative device 19 is within a predetermined pressure value range, and outputs a signal obtained by the judgement to the driving speed determining device 10.

The logical operation unit 4 comprises the weighted error detector 5, the initial speed generator 6, the drive/stop signal generator 7, the driving speed determining device 10, the pressure-derivative device 19, the timer 20 and the pressure value range judging device 21.

The operation of the second embodiment of the present invention will be described.

The logical operation unit 4 receives, from input control devices 1a–1d, signals of operating mode such as room-cooling and room-warming and drive/stop instruction for an air conditioning apparatus, signals concerning target room temperature which are supplied from target temperature setting devices 2a–2d, temperature signals from the room temperature sensors 3–3d, and an output signal from the pressure sensor 15. The logical operation unit 4 carries out logic operations on the basis of the input signals to output a drive/stop signal for the motor 13 and a speed signal to the motor driving controller 12. The controller 12 controls the operation of the motor 13 in accordance with the signals.

The function of the logical operation unit 4 will be described in more detail.

The weighted error detector 5 compares set values determined by the setting devices 2a–2d with the room temperatures measured by the room temperature sensors 3a–3d to obtain respective temperature errors $\Delta Ta$–$\Delta Td$. Then, an average value of weighted errors is obtained by multiplying a performance ratio of four room units with the temperature errors $\Delta Ta$–$\Delta Td$ when the input control devices 1a–1d are in ON state. Further, an output signal obtained by multiplying a constant K with the average value is supplied to the drive/stop signal generator 7 and the driving speed determining device 10.

The drive/stop signal generator 7 receives signals from the input control devices 1a–1d and a signal from the weighted error detector 5, and supplies a signal of operation or stop to the motor driving controller 12. At the initiation of the operations, the initial speed generator 6 receives a signal from the input control devices 1a–1d to thereby output a signal of initial speed to the driving speed determining device 10.

A signal from the pressure sensor 18 is inputted to the pressure-derivative device 19 to obtain the difference component $\Delta P$ with respect to a discharged pressure before a certain time $\Delta t$ by means of the timer 20. A signal of the sum of the pressure Po measured by the pressure-delivative device 19 and the difference component $\Delta P$ is outputted to the pressure value range judging device 21. The pressure value range judging device 21 supplies a signal of "+1" to the driving speed determining device 10 when the estimated pressure Po +$\Delta P$ is smaller than the lowest value P1 of a predetermined pressure range, it supplies a signal of "−1" when the estimated pressure Po +$\Delta P$ is greater than the highest value P2, and it supplies a signal of "0" to the driving speed determining device 10 when the estimated pressure is within the predetermined range P1–P2.

The driving speed determining device 10 receives the signals of the initial speed generator 6, the weighted error detector 5 and the pressure value range judging device 21. When the signal of the initial speed generator 6 is "+1", the device 10 generates with priority a signal of a predetermined initial speed to the driving controller 12. When there is no signal from the initial speed generator 6, (i.e. in the case of "0") and the signal from the pressure value range judging device 21 is "0", a signal of the quantity of speed change K$\Delta$THz which is obtained by multiplying a predetermined value K with the temperature error $\Delta T$ produced by the weighted error detector 5, is outputted to the motor driving controller 12.

When the signal of the pressure value range judging device 21 is "+1", a signal K$\Delta$THz +$\Delta$Hz obtained by adding a correction value for enlargement $\Delta$Hz to the above-mentioned speed change quantity K$\Delta$THz, is supplied to the motor driving controller 12. On the other hand, when the signal of the pressure value range judging device 21 is "−1", a signal K$\Delta$THz −$\Delta$Hz obtained by adding a correction value or reduction −$\Delta$Hz to the speed change quantity K$\Delta$THz, is supplied to the motor driving controller 12.

Thus, when the value of an estimated pressure after a certain time is estimated to be lower than a predetermined pressure value range, the frequency of a current to be supplied to the motor is modified to be increased. When the estimated pressure is to exceed a predetermined pressure value range, the frequency is modified to be reduced. Accordingly, the frequency for the motor is controlled so that a pressure at the discharge side of the compressor is within a predetermined pressure range. With such construction, a continuous operation can be obtained error under an excessive load condition such as liquid-back, and the rising time in a refrigeration cycle can be shortened since the frequency can be increased at the time of a pressure value being lower than a predetermined range. Further, it is not necessary to take measures to prevent a high pressure. In addition, refrigeration cycle can be controlled to provide an appropriate performance since the frequency is determined by a weighted error average value of the difference between each target room temperature and each room temperature in a multi-refrigeration cycle.

In the second embodiment of the present invention, a pressure sensor and a control means including a discharge pressure estimating means and a pressure value range judging means are provided as a sensor to control the operation of the motor. Accordingly, when an estimated pressure value is smaller than a predetermined pressure range, the frequency for the motor is corrected to be increased, and on the other hand, when the estimated pressure value is greater than the predetermined range, the frequency is corrected to be reduced, with the cosequence that a continuous operation is obtainable even under excessive load condition without reaching faile safe protection of high pressure, and the rising time in refrigeration cycle can be shortened, whereby reliability and comfortableness for the control apparatus can be increased.

In the second embodiment of the present invention, the refrigeration cycle can be controlled to provide an appropriate performance since the frequency is determined by using a weighted average value of the temperature error in each of the rooms in the multi-refrigeration cycle.

While the primary current sensor 14 is used in the first embodiment, a torque sensor for detecting a torque produced in the motor 13 may be used.

When the pressure sensor is used in the second embodiment, a saturation temperature sensor may be used for detecting the temperature of a condenser.

As described above, in accordance with the present invention, a value corresponding to a load produced in a refrigeration cycle such as a primary current or torque in the motor, or a pressure of air discharged form the compressor, or the saturation temperature in a condenser is detected by a sensor in such a manner that when an estimating value obtained by the sensor is lower than a predetermined value, the frequency of a current to the motor is increased, and when the estimated value is higher than the predetermined value, the frequency is decreased. Accordingly, a continuous operation can be obtained even under overload condition, the rising time in the refrigeration cycle is shortened, whereby reliability of the control apparatus and comfortableness can be increased.

Further, it is possible to obtain an appropriate performance by determining the frequency by using a weighted average value of the temperature errors in each of the rooms in a multi-refrigeration cycle.

Obviously, numerous modifications and variations of the present invention are possible in light of the above teachings. It is therefore to be understood that within the scope of the appended claims, the invention may be practiced otherwise than as specifically described herein.

WHAT IS CLAIMED IS:

1. A frequency control apparatus of a multi-refrigeration cycle system comprising a motor for a compressor, the motor being driven at a variable speed by controlling frequency and a temperature error detecting means to detect an error between a target temperature in rooms to be air-conditioned and an actual temperature in said rooms to thereby generate an instruction of speed depending on said temperature error so as to control driving speed for said motor, said frequency control apparatus being characterized by comprising a sensor for detecting a load in refrigeration cycle operations, an estimating and judging means for making judgement as to whether or not an output value from said sensor is in a predetermined range, and a controlling means which corrects to increase the frequency in response to said instruction of speed when an estimated value of said output is lower than said predetermined range, and corrects to decrease the frequency in response to said instruction of speed when said estimated value is higher than said predetermined range.

2. The frequency control apparatus according to claim 1, wherein said sensor is a current sensor to detect a primary current to be supplied to said motor.

3. The frequency control apparatus according to claim 1, wherein said sensor is a pressure sensor to detect a pressure at the discharge side of said compressor.

* * * * *